United States Patent [19]

Bernadic et al.

[11] Patent Number: 5,193,947
[45] Date of Patent: Mar. 16, 1993

[54] HIGH DEPTH, LOW FORCE CUTTING INSERT

[75] Inventors: Thomas J. Bernadic, Madison Heights; Karl Katbi; Sreedwaraka P. Boppana, both of Troy, all of Mich.

[73] Assignee: GTE Valenite Corporation, Troy, Mich.

[21] Appl. No.: 664,016

[22] Filed: Mar. 4, 1991

[51] Int. Cl.⁵ .............................................. B23B 27/22
[52] U.S. Cl. ...................................... 407/114; 407/116
[58] Field of Search ................................. 407/114–116

[56] References Cited

U.S. PATENT DOCUMENTS

| Re. 32,636 | 4/1988 | Stashko | 407/114 |
|---|---|---|---|
| 3,381,349 | 5/1968 | Newcomer | 407/114 X |
| 3,792,514 | 2/1974 | Ushijima | |
| 3,947,937 | 4/1976 | Hertel | 407/114 |
| 4,214,845 | 7/1980 | Mori | 407/114 |
| 4,215,957 | 9/1980 | Holma et al. | 407/114 |
| 4,273,480 | 6/1981 | Shirai et al. | 407/114 |
| 4,318,645 | 3/1982 | McCreery | 407/114 |
| 4,335,984 | 6/1982 | Zweekly | 407/114 |
| 4,561,809 | 12/1985 | Porat et al. | 407/114 |
| 4,626,141 | 12/1986 | Malaker et al. | 407/114 |
| 4,776,732 | 10/1988 | Hale | 407/114 |
| 4,846,609 | 7/1989 | Bernadic et al. | 407/114 |
| 4,941,780 | 7/1990 | Takahashi | 407/114 |

Primary Examiner—Steven C. Bishop
Attorney, Agent, or Firm—Bill C. Panagos

[57] ABSTRACT

A high depth, low force, polygonal throw away indexable cutting insert to turn ductile materials like steel at low to high cutting speeds and medium to high ranges of feed and depth of cut.

15 Claims, 2 Drawing Sheets

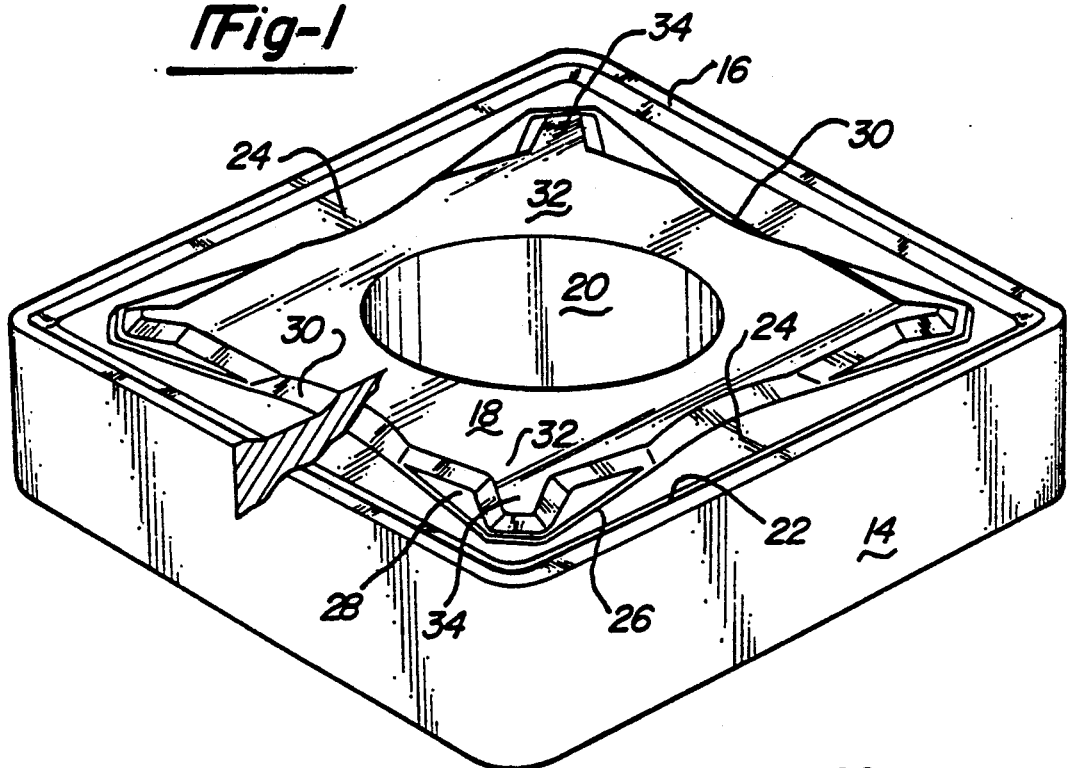
*Fig-1*
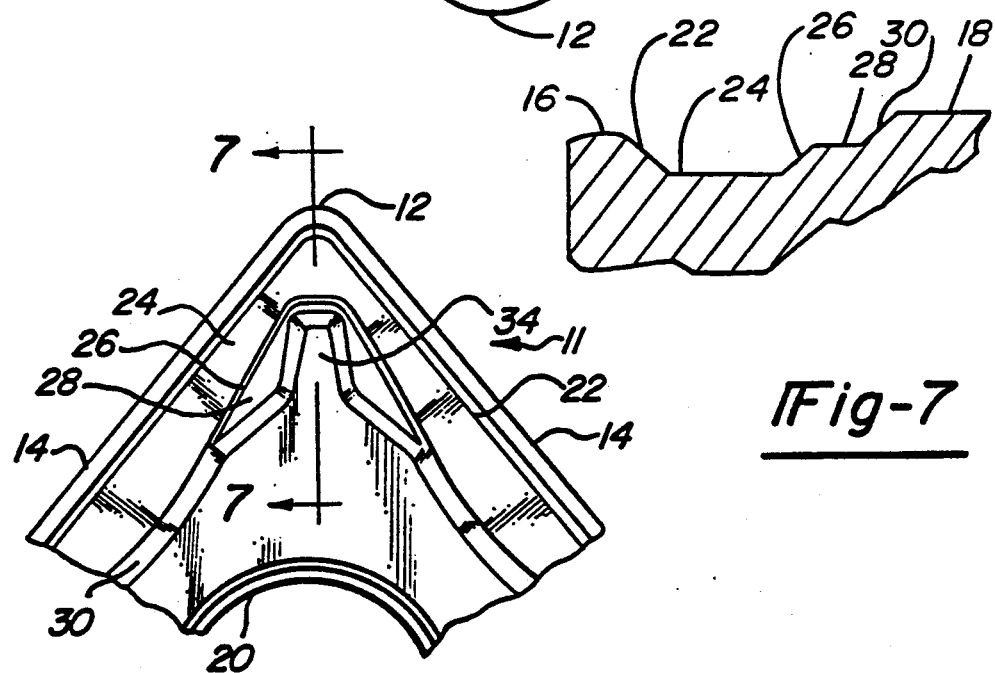
*Fig-7*
*Fig-6*

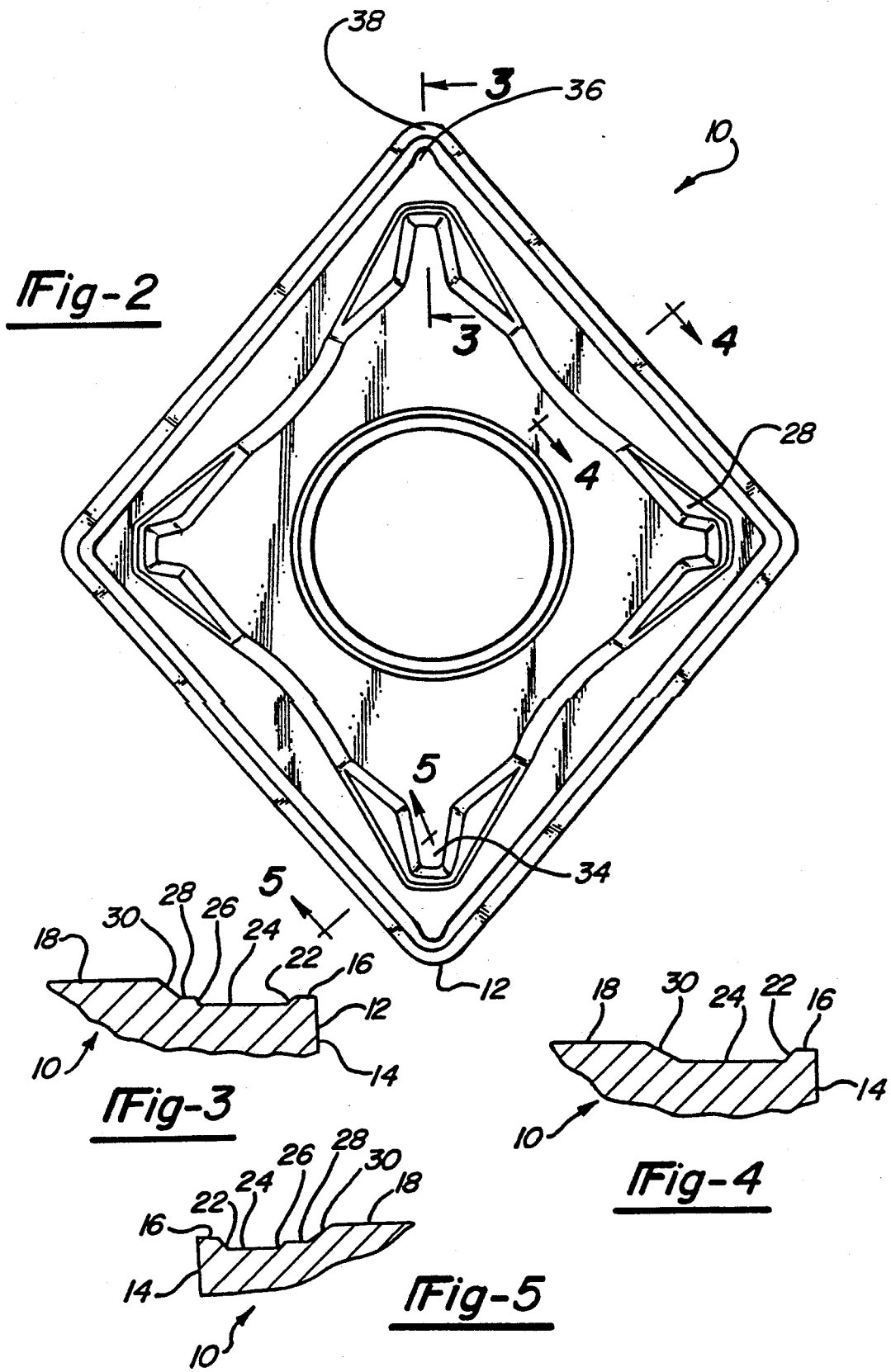

HIGH DEPTH, LOW FORCE CUTTING INSERT

BACKGROUND OF THE INVENTION

1. Field of the Invention

The present invention relates to high depth, low force throw away cutting inserts to turn ductile material like steel at low to high cutting speeds and medium to high ranges of feed and depth of cut.

The present invention further relates to a high depth, low force throw away cutting insert which is capable of withstanding mechanical impact under interrupted machining conditions without effecting the cutting life of the tool.

The present invention further relates to a high depth, low force throw away cutting insert to turn ductile material which maintains good chip control.

2. Description of the Related Art

Chip control inserts are well known in the art where a island on the face of the insert adjacent the cutting edge terminates in a ramp shoulder in the flow path of the chip serving to curl and/or break the chip. It is also known in the art to provide a positive rake cutting action serving to decrease power requirements either by tapering the sides extending to the cutting edge or providing a positive rake land on the face perimeter extending from the cutting edge. Special chip breaking effects have been achieved by providing a series of chip deflecting grooves or depressions spaced along the cutting edge such as is disclosed in U.S. Pat. Nos. 4,215,957; 4,273,480 and 4,335,984.

Recess grooves or faces with chip breaking projections are also known in the art, particularly for use in turning operations such as are disclosed in U.S. Pat. No. 3,792,514 wherein a uniform concave groove in provided along each cutting edge of the insert for chip breaking in heavy cutting in combination with a nose projection in the concave groove isolated from an island on the insert serving for chip breaking in light cutting operations. Another form of such insert is disclosed in U.S. Pat. No. 4,214,845 including a pair of chip breaking projections at each corner with another projection on the bisector behind the first projections. Another insert is disclosed in U.S. Pat. No. 4,626,141 wherein good chip control is achieved, but there is still some improvement to be made in the areas of chip deceleration and wear of the insert during cutting.

McCreery, U.S. Pat. No. 4,318,645 discloses a polygonal insert of a hard, wear resistant material. The insert includes a bump behind each corner of the insert which serves as a chip breaker. The bump is separated from the cutting edge land by a lower secondary land which has its maximum height and width in each corner area of the insert. The height and width gradually decrease as the secondary land extends away from the corner area in a direction parallel to the cutting edge.

Malaker et al., U.S. Pat. No. 4,626,141 discloses a polygonal shaped chip control insert characterized by a chip control groove extending across the insert corners and along an edge extending from these corners with increasing width away from the cutting corner. The groove is formed with a radius extending below a narrow positive rake cutting edge land to a maximum depth tangent with the bottom of the groove.

The present invention differs from all these developments of the prior art because it offers improved mechanical impact strength which is useful when there are interrupted machining conditions, and allows the insert to turn ductile material such as steel at low to high cutting speeds and medium to high ranges of feed and depth of cut.

It has long been a problem in the art to arrive at a disposable cutting insert which is capable of turning ductile materials and yet be affordable, and offer different feed rates and depths of cut. The present invention meets these long felt needs and offers a chip breaking capability range which is surprising, especially in view of the different feed rates at which the insert is designed to operate.

It is therefore an object of the present invention to provide for a disposable insert to turn ductile material at low to high cutting speeds and medium to high ranges of feed and depth of cut.

It is a further object of the present invention to provide a disposable cutting insert which exhibits excellent chip breaking capability over a wide range of feed rates and depths of cut, an lower consumption of cutting forces and horsepower.

It is a further object of the present invention to provide a cutting insert which exhibits improved wear resistance.

It is a further object of the present invention to provide for a cutting insert which has excellent impact strength.

It is a further object of the present invention to provide a insert with a double step island to minimize insert chipping and provide superior chip breaking capabilities.

Other objects and uses for the cutting inserts of the present invention will become apparent to those of ordinary skill in the art after a reading of the specification and claims.

SUMMARY OF THE INVENTION

The present invention is directed to a polygonal, throwaway cutting insert which is designed to turn ductile material such as steel at low to high cutting speeds and a medium to high range of feed and depth of cut. The insert of the present invention exhibits a chip breaking capability over a wide range of feed and depth of cut. The insert may be configured to have a neutral land which is variable in width along the length of the insert. The insert is also capable of having a constant land with a concave radius shape instead of the neutral land. According to the present invention, a cutting insert with a neutral land and variable land width exhibits good wear resistance properties. This is advantageous in that lower cutting forces may be used without sacrificing any machining performance in terms of tool life. A cutting insert with a radius land with a variable land width, as also described by the present invention, exhibits good impact strength. The advantage to that configuration is that the land is well suited to withstand heavy interrupted machining conditions, which conditions induce mechanical impact stress to the insert.

BRIEF DESCRIPTION OF THE DRAWINGS

FIG. 1 is a perspective view of the insert of the present invention.

FIG. 2 is a top view of the insert of another embodiment of the present invention using radiused corners.

FIG. 3 is a cut away side view of the insert of the present invention showing the surfaces and chip breakers along line 3—3.

FIG. 4 is a cutaway side view of the insert of the present invention showing the surfaces and chip breakers along line 4—4.

FIG. 5 is a cut away side view of the insert of the present invention showing the surfaces and chip breakers along a line 5—5.

FIG. 6 is a detail of the top view of the embodiment of FIG. 1 showing the corner chip breaker surface.

FIG. 7 is a side view of another embodiment of the insert of FIG. 6 taken along line 5—5 showing the convex land surface.

DETAILED DESCRIPTION OR THE PREFERRED EMBODIMENT

Turning now to the drawings, wherein like numerals depict like structures, polygonal lay down indexable insert 10 is configured to have cutting corners 12 and flanks 14. Land 16, which may be neutral, variable or convex, may be radiused and runs along the entire perimeter of the insert, thereby forming the initial contact surface to the material to be cut. The insert has central island 18 which is provided with a central aperture 20, which is used to secure the insert into position on the tool (not shown) in a manner such as is well known to those of ordinary skill in the art. The island may be provided with a countersunk surface proximal to said aperture to minimize the amount of grind stock to be removed as well as to provide minimal warpage of the insert after sintering.

Entry angle surface 22 is provided around the perimeter of the insert and proximal to land 16. The entry angle functions to cause the chip of cutting material along the surface of the insert to start to curl up, thereby providing chip breaking qualities to the insert. Groove width variable 24 is located around the periphery of the insert and is proximally located relative to the entry angle 22. Groove width 24 is configured to be of variable width, i.e., narrow towards the corner of the insert and with a wide flank in the middle of the insert.

Incident angle 26 is provided proximal to chip deceleration pad 28 to aid in chip flow deceleration. The deceleration pad aids in controlling the chip. The deceleration pad curls and strains the chips at a moderate feed rate and depth of cut to produce acceptable chips during machining. Acceptable chips are those which from during operation which are cut off the work piece and which break off in short pieces so as not to interfere with the machining operation. In addition, the chip deceleration pad provides an added protection against chipping and cratering of the main island under heavy and interrupted machining conditions. The chip deceleration pad is higher off the groove width 24 then the entry angle, and preferably 0.003 inches higher than the groove.

The island is provided with a incident angle 30 which serves to break chips formed during the machining operation and further serves to protect the island from fracture, cratering and wear. The island surface 32 is higher than the incident angle 30 relative to the groove 24, and preferably is 0.004 inches higher than the land and 0.011 higher than the groove.

The island is further refined by the island primary chip breaker area 34. Area 34 is capable of withstanding high mechanical pressure from decelerated chips and its sharp contours serve to break the chips formed during the cutting operation into small, manageable "6" and "9" shaped chips.

Two embodiments are contemplated within the present invention. FIG. 2 depicts the top plan view of the insert which is contemplated for use when breakage and chipping is a primary feature. The corner is provided with a radiused nose portion 36, which gives excellent mechanical strength and is particularly suited for use where there is interrupted machining. By way of example, where the entry angle 22 is 0.022 inches in width, the corner has an entry angle 38 which is 0.016 inches in width. It has been surprising that this variation in geometry provides excellent cutting under the conditions previously described, and still affords good mechanical properties.

The present invention is directed to a polygonal throwaway insert to turn ductile material such as steel at low to high cutting speeds and medium to high ranges of feed and depth of cut. The chip breaking capability range of this new insert is somewhere in the range of about 0.014 to 0.040 ipr for feed rate, and 0.040 to 0.350 inches for depth of cut.

The chip breaker profile taken at the nose portion along the chipbreaker consists of a land 16 and an entry angle 22 which is followed by variable group with 24. Incident angle 26 is proximal to the groove width at the nose portion and is followed by the chip deceleration pad. An incident angle 30 rises from the deceleration pad and merges with items surface 18 angled surface 26 and 30 is to provide additional strength to the cutting edge. The primary positive land is to lift up the chip at very low ranges of feed and depth of cut. At higher the ranges of feed, the land with the steep entry angles serves to guide the chip into the deceleration pad and interrupt its continuous motion for further curling. This land also functions to minimize friction wear, generating lower cutting forces, lower cutting temperatures.

The width of the whole land is in the range of 0.0185 starting from the cutting edge to the end of the secondary positive land. The groove width is 0.0215 inches wide and has a flat bottom. The flat bottom may have a radiused shape to form a convex or concave surface. The groove serves to change the curling motion of the chip, hence changing its strain hardening level for further breakage. The first primary section intersects with the groove bottom at a primary exit angle and intersects with the secondary section to form a secondary exit angle. The back wall exists only at the nose section of the cutting point. The back wall, with its steep differential slope functions to change the chip's strain level in order to curl the chip in a way that the radius of curl is large enough to cause breakage, and the shear stresses are exactly equal to the break stresses, thereby producing acceptable chips at low range of feed and depth of cut. In addition, the back wall adds strength to the nose area.

Turning to FIG. 6, it can be seen that the nose area 36 has a symmetrical ridge 40 symmetrical disposed on the declaration pad. The ridge functions to add strength to the nose section and in some cases aids in curling chips away from the insert. The ridge may have rectangular, triangular, cone or convex shape.

Turning to FIG. 5, the flank area has the same configuration as that of FIG. 3, with the following modification. The double positive land forces the chip to undergo different levels of deformation for good chip breakability over the widest applicable ranges of feed and depth of cut.

FIG. 5 is a cutaway side view of the instrument taken alone line 5—5. The land 16 is of different width than that seen in FIG. 3 and the variable width groove 24 is also narrower than seen in FIG. 3 Notice also, that the width of the chip declaration pad is greater than that shown in FIG. 3.

FIG. 7 is a side sectional view taken along lines 7 of FIG. 6 and shows that the land 16 may be of a convex shape. Although land 16 may have a convex profile, the rest of the configuration of the insert geometry is the same as that seen in FIG. 3.

Various modifications will no doubt occur to those of ordinary skill in the art without departing from the scope and spirit of the invention.

We claim:

1. A high depth, low force lay down indexable cutting insert, comprising:
   (a) a polygonal body having a top and a bottom, cutting corners, flanks and a land along the top of the body;
   (b) an entry angle surface proximal to said land and extending around the perimeter of the body adjacent to said land;
   (c) a variable width groove proximal to said entry angle, said groove being progressively narrower toward the corners of the polygonal body and being lower than said land;
   (d) a polygonal planar island supported on the insert body and raised above the variable width groove, said island having a central aperture therethrough to facilitate securing of the insert onto a tool, said island having a chip breaking angle around its periphery and a primary chip breaker at each of the corners of the polygonal island; and
   (e) chip deceleration pads at each of said corners of the island, said chip deceleration pad being raised above the variable width groove and lower than said island, said chip deceleration pad abutting said chip breaking angle at the corners of the island on one side and joining the variable which groove by means of a chip deceleration angle on the other; whereby, a chip is cut from work piece at the cutting corner of the insert, enters the insert along the entry angle, is forced against the chip deceleration angle and onto the chip deceleration pad and then onto the chip breaking angle of the island and then into the primary chip breaker area of the island, thereby breaking the chip.

2. The insert of claim 1, wherein said cutting corner is radiused to impart improved mechanical impact strength to the insert during operation.

3. The insert of claim 1, wherein said land is neutral.

4. The insert of claim 1, wherein said land is variable.

5. The insert of claim 1, wherein said chip deceleration pad is about 0.003 inches higher than said groove.

6. The insert of claim 1, wherein said island is about 0.011 inches higher than said groove.

7. The insert of claim 1, wherein said island is higher than said land.

8. The insert of claim 7, wherein said island is about 0.004 inches higher than said land.

9. The insert of claim of claim 2, wherein said entry angle around the radiused portion is about 0.016 inches in width and the entry angle around the remainder of the insert is about 0.022 inches in width.

10. The insert of claim 1, wherein said entry angle is about 12 degrees.

11. The insert of claim 1, wherein said groove is 0.0215 inches wide at it widest point and narrows progressively toward the cutting corners.

12. The insert of claim 1, wherein said groove has a flat bottom having a radiused shape.

13. The insert of claim 12, wherein said groove bottom radiused shape forms a convex surface.

14. The insert of claim 12, wherein said groove bottom forms a concave surface.

15. The insert of claim 1, wherein said island is provided with a countersunk surface proximal to said aperture, thereby reducing the island surface and minimizing warpage to the insert after sintering.

* * * * *